United States Patent

Olofsson

[19]

[11] Patent Number: 6,047,238
[45] Date of Patent: Apr. 4, 2000

[54] METHOD AND A DEVICE FOR PATH PROFILE GENERATION

[75] Inventor: Per Olofsson, Kista, Sweden

[73] Assignee: Telefonaktiebolaget LM Ericsson, Stockholm, Sweden

[21] Appl. No.: 09/033,672

[22] Filed: Mar. 3, 1998

[30] Foreign Application Priority Data

Mar. 14, 1997 [SE] Sweden ................................. 9700927

[51] Int. Cl.[7] ................................................... G06F 19/00
[52] U.S. Cl. ........................................................... 702/2
[58] Field of Search ........................ 702/2, 3, 5; 455/446

[56] References Cited

U.S. PATENT DOCUMENTS

| 4,342,033 | 7/1982 | De Camargo | 343/753 |
| 5,815,813 | 9/1998 | Faruque | 455/446 |

OTHER PUBLICATIONS

Liu et al, "Modelling Microcellular Radio Wave Propagation", IEEE Vehicular Technology Conference, vol. 2, Apr. 28–May 1, 1996, (Atlanta, Georgia), pp. 1278–1282.

Grosskopf, "Prediction of Urban Propagation Loss", IEEE Transactions on Antennas and Propagation, vol. 42, No. 5, May 1994, pp. 658–665.

Bertoni, et al., "UHF Propagation Prediction for Wireless Personal Communications", Proceedings of the IEEE, vol. 82, No. 9, Sep. 1994, pp. 1333–1359.

*Primary Examiner*—Donald E. McElheny, Jr.
*Attorney, Agent, or Firm*—Nixon & Vanderhye, P.C.

[57] ABSTRACT

In a method and a device for generation of path profiles for use in radio wave propagation planning, several path profiles, adjacent to a generated first, primary path (501) are generated (503). Obstacles detected in the adjacent path profiles are then transformed and translated (505) onto the primary path profile, whereby a resulting path profile taking into account both obstacles present in the primary path profile and obstacles close to it. The method and the device are particularly useful in urban and suburban areas where obstacles tend to be of a discrete nature, and can be used for many types of applications such as point-to-point, point-to-multipoint and area coverage applications.

11 Claims, 6 Drawing Sheets

METHOD AND A DEVICE FOR PATH PROFILE GENERATION

TECHNICAL FIELD

The present invention relates to a method and a device for generation of path profiles for use in radio wave propagation planning, including point-to-point, point-to-multipoint and area coverage applications, and which are particularly useful in urban and suburban areas.

BACKGROUND OF THE INVENTION

In the planning of radio wave propagation for point-to-point, point-to multipoint connections as well as for area coverage applications etc., path profiles are today usually generated between specified endpoint coordinates, using raster format topography data, such as elevation, clutter, obstacles, etc. The quality of a generated path profile depends heavily on the quality of the input data sets, as well as the algorithms used. The main sources for uncertainties can be listed as follows:

Map projection. Approximations in the map projection will affect the azimuth and distance of the path profile.

Topography data resolution. Uncertainties in the heights of obstacles and clutter will directly affect the data values of the path profile, as will uncertainties in the location or extent of obstacles. Using topography data with a resolution too low for the application at hand will also result in large uncertainties.

Path profile generation algorithm. Approximations in the algorithm will affect the data values of the generated path profile. This includes intricate considerations for determining discrete endpoint coordinates, the direction in which to generate the profile, the interpolation method used to extract data from the raster, etc.

The most desirable solution would be to completely eliminate all of these short-comings, but this is neither feasible nor possible. It is, however, possible to make the short-comings less significant.

Thus, topography data can be improved by means of simply increasing the resolution. This is always a good solution, but normally rather expensive. The vertical resolution of the topography data can be taken into account in the predictions. This will normally produce a more pessimistic result, which can be compared to the result obtained in a standard manner. Path profile generation algorithms can be made to use refined interpolation methods. This will normally be a good solution for non-urban areas, but will not eliminate the problems for urban areas, where obstacles tend to be discrete with respect to normal raster resolutions.

For example, a simple interpolation method is linear interpolation between the two closest raster points. This method is not very well suited for urban areas. Another method is selecting the highest of the two closest raster points. This method is better suited for urban areas, although constantly pessimistic. Yet another method is linear interpolation in the plane spanned by the three closest raster points. This method is not very well suited for urban areas.

Regardless of the path profile generation algorithm used, there will always remain some possibility for missing obstacles in the raster data, but this phenomenon will be less frequent for higher raster resolutions, or when using more sophisticated algorithms.

SUMMARY

It is an object of the present invention to provide an improved method and device for generation of path profiles which are especially well suited for urban and suburban areas and which therefore overcome some of the deficiencies associated with the prior methods.

This object is obtained by means of generating multiple path profiles whereby a broader view of the path in question is provided. This will improve the sensitivity to adjacent obstacles, which is especially useful in urban areas.

The method can be summarised into the following basic steps:

First a primary path profile according to the prior art is generated.

Thereupon a number of adjacent path profiles are generated.

The generated adjacent path profiles are then transformed according to some suitable scheme onto the primary path profile, and The resulting path profile is used as planning input data.

The path profile generation algorithm according to the prior art considers only the intersection of the raster with the straight line between the endpoints. In reality, the whole of the first Fresnel zone should be considered for possible obstacles. This can be achieved by generating a set of adjacent path profiles, in addition to the primary one. Potential obstructions missed out in the primary path profile will be caught by one of the adjacent ones. This approach is hence useful wherever adjacent obstacles are present, and especially in urban and suburban environments.

Once generated, the multiple path profiles can be utilised as follows:

Each of the path profiles is kept as a separate entity. The path profile handling is modified to treat the full set of primary and adjacent path profiles. This implies that any calculation must be repeated for each path profile, and that any display or result presentation must accommodate more than one path profile, or, at worst, the whole set. The main advantage of this method is that it permits direct comparisons of the end results (signal levels, fade margins, quality measures, etc.) between primary and adjacent path profiles, or Each of the adjacent path profiles is merged with the primary path to produce a single, merged profile that can be used in exactly the same way as path profiles are currently being used in radio wave propagation planning. The main advantage of this method is that it only affects the path profile generation routine, and leaves the rest of the system unaffected, while still taking into account any adjacent obstacles in the generated path profiles. A slight drawback would be the performance loss due to the line-of-sight calculations required by the merging process.

BRIEF DESCRIPTION OF THE DRAWINGS

The present invention will now be described in more detail by way of non-limiting examples and with reference to the accompanying drawings, in which.

DETAILED DESCRIPTION OF PREFERRED EMBODIMENTS

Figure 1:
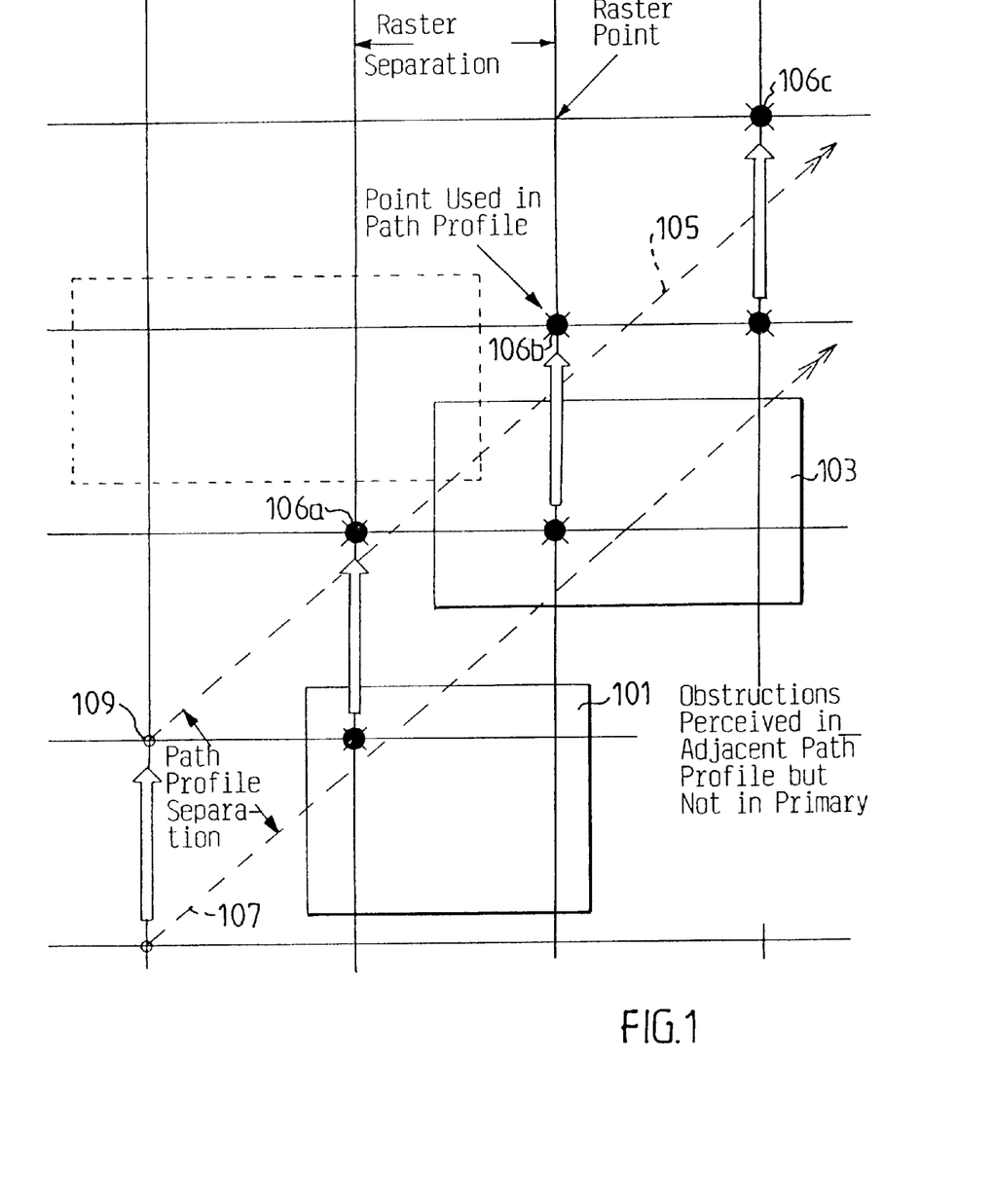
FIG. 1 is an overall view of path profiles in a raster.

In FIG. 1, a general view from above of an urban area, is shown. In FIG. 1 the reference numerals 101 and 103 denote buildings, the dashed line 105 a primary path profile, and the dashed line 107 an adjacent path profile. Furthermore, the grid in the FIG. 1 illustrates the raster, and the intersections between the raster lines are associated with data indicating the coordinates of the raster points and the height at the individual raster points.

In this example, the primary path profile is taken from a point 109 along the line 105. If the closest raster data points, i.e. the points 106a, 106b and 106c, respectively, along this line 105 are used as prediction data, no obstacles are predicted to be present in the radio propagation path. If, on the other hand, more advanced prediction methods are employed such as interpolation between neighbouring raster data points the prediction might be improved, but will still be poor due to the discrete heights of the urban area.

A better way would therefore be to generate adjacent path profiles, in particular parallel path profiles, covering the entire first Fresnel zone of the path and to use the maximum values within the first Fresnel zone as prediction values. Such a method would, however, be over-pessimistic, and a more advanced and accurate prediction method is therefore desired.

Figure 2:
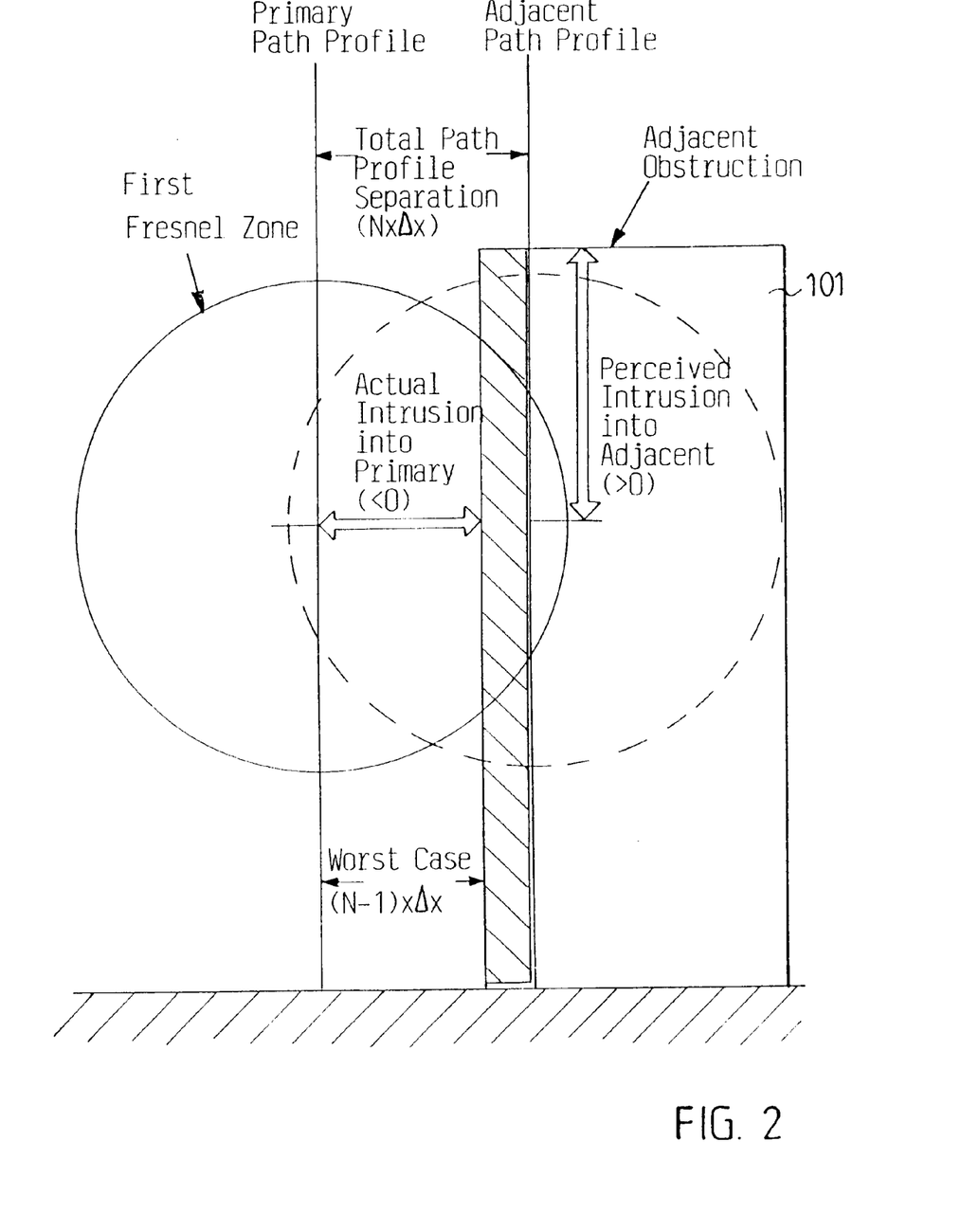
FIG. 2 is a view along the sight lines of a primary and an adjacent path.

In FIG. 2, a view along the sight lines of the primary path 105 and the adjacent path 107 past the building 101, are shown. It is seen that the line 105 goes clear of the building 101, but the building 101 still intrudes into the first Fresnel zone of the propagation path for the radio waves. The presence of the building 101 is however detected by the adjacent path profile along the line 107.

One way to take this information into account is to translate the information onto the primary profile using a 1:1 transformation. However, as pointed out above, this transformation is in most cases over-pessimistic as is seen in FIG. 3.

Figure 3:
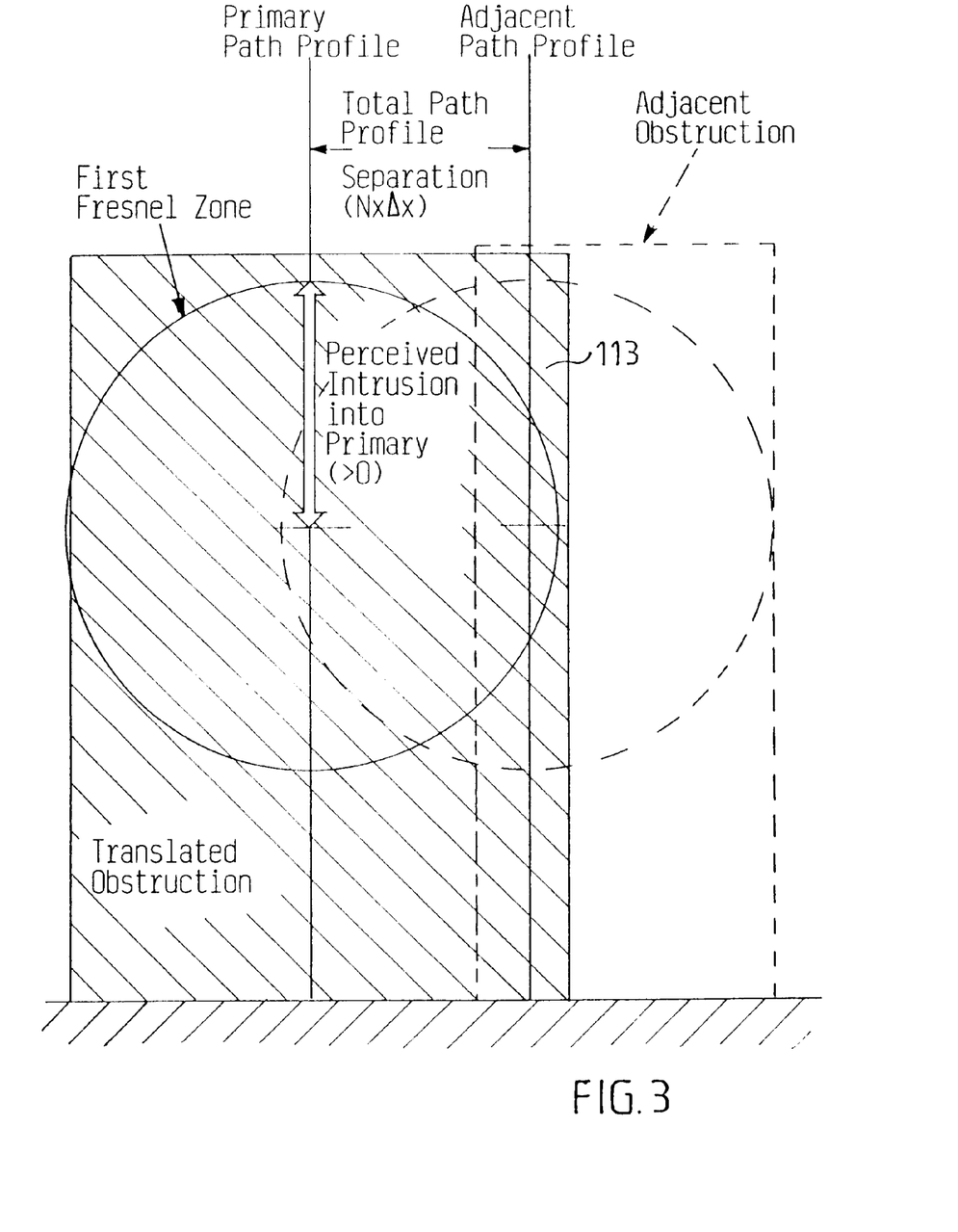
FIG. 3 is a view illustrating a translated adjacent path profile.

In FIG. 3, the building 101 translated into an obstruction 113 in the primary path profile, is shown. In this example the prediction would be a total blocking of the first Fresnel zone of the radio wave propagation path.

Another, much more accurate, prediction is obtained if the following transformation is performed. If an obstacle is detected along any of the adjacent path profiles, the distance between the adjacent path profile and the primary path profile is derived. The wall of the building is then presumed to end somewhere between the adjacent path and the primary path. A preferred such presumption is half way between the detected obstacle and the nearest path profile.

It is then checked how much the presumed building ending intrudes into the first Fresnel zone, and this distance is then treated as an equivalent knife-edge obstruction of the radio wave propagation path.

Figure 4:
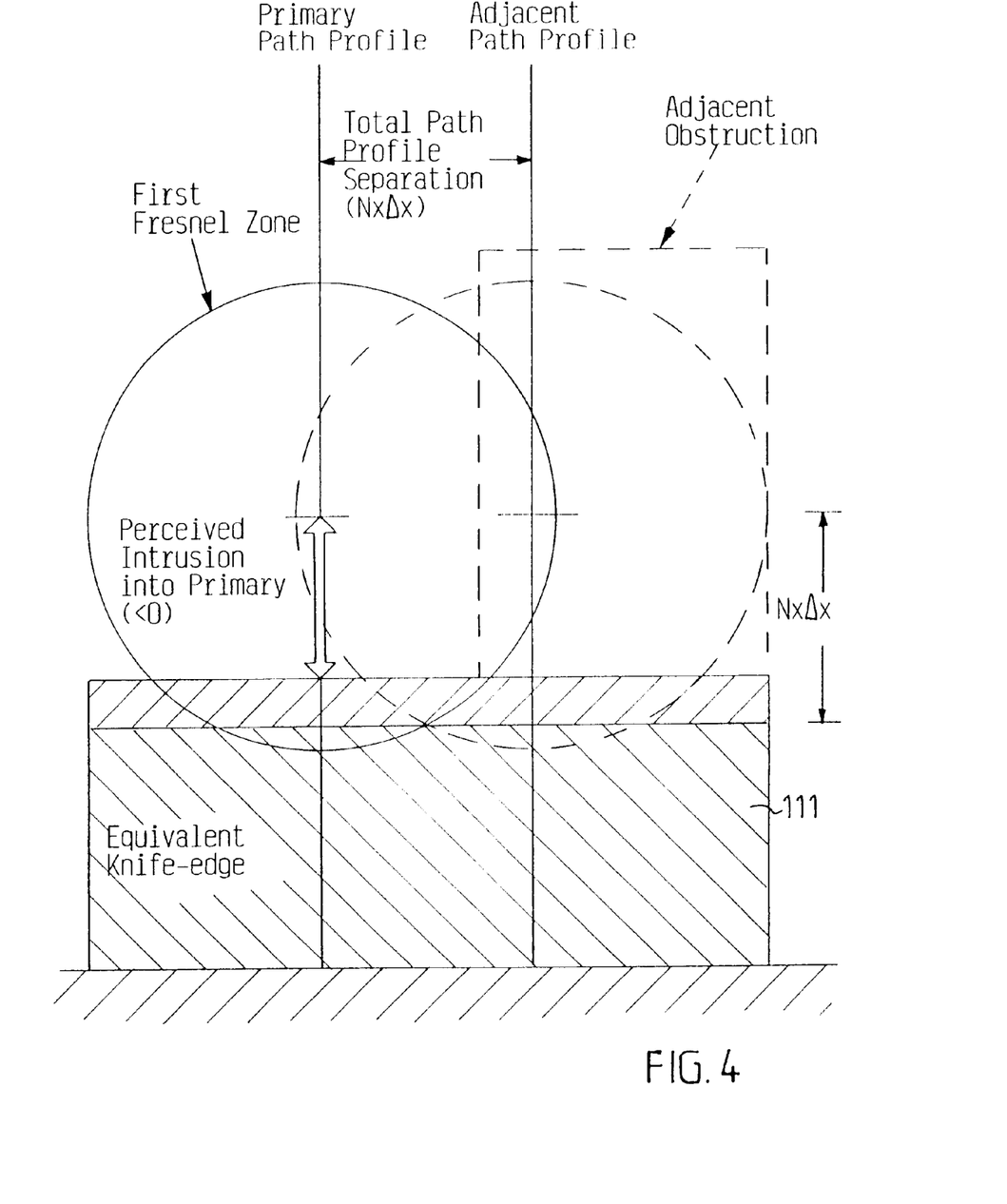
FIG. 4 is a view illustrating a transformed and translated adjacent path profile.

Thus, in FIG. 4, the original building 101 is transformed into an equivalent obstacle 111, but which is located on the primary path profile. The equivalent obstacle 111 will be identical to the presumed building wall with regard to the significant radio wave propagation characteristics.

Figure 6:
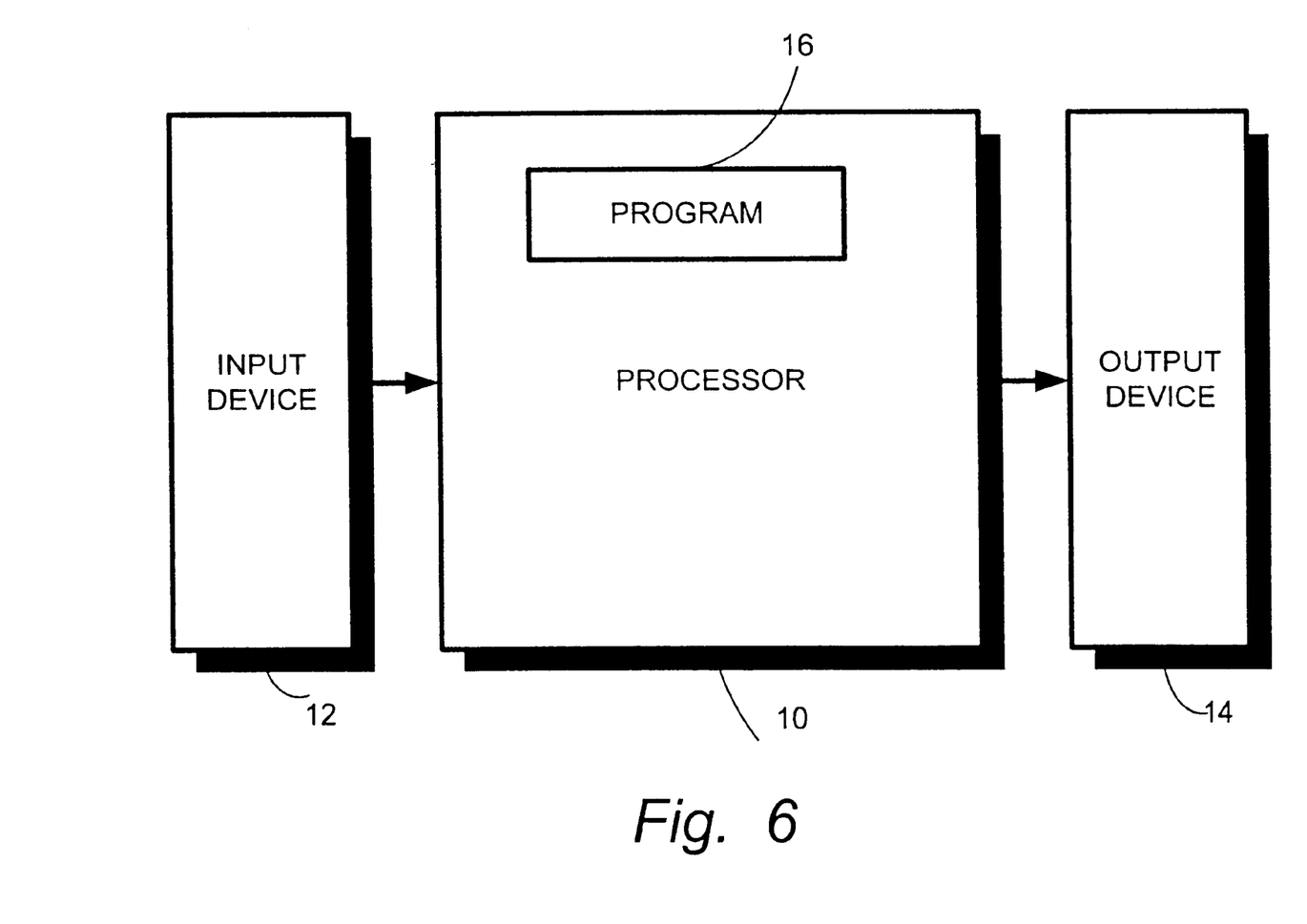
FIG. 6 is a schematic view of a system for performing the steps of FIG. 5.

An example computer system for implementing the present invention is shown in FIG. 6. The computer system of FIG. 6 includes a processor 10, an input device 12, and an output device 14. The processor 10 executes a computer program 16 (stored in a memory), the execution of the computer program 16 resulting in performance of steps of the method herein described.

Figure 5:
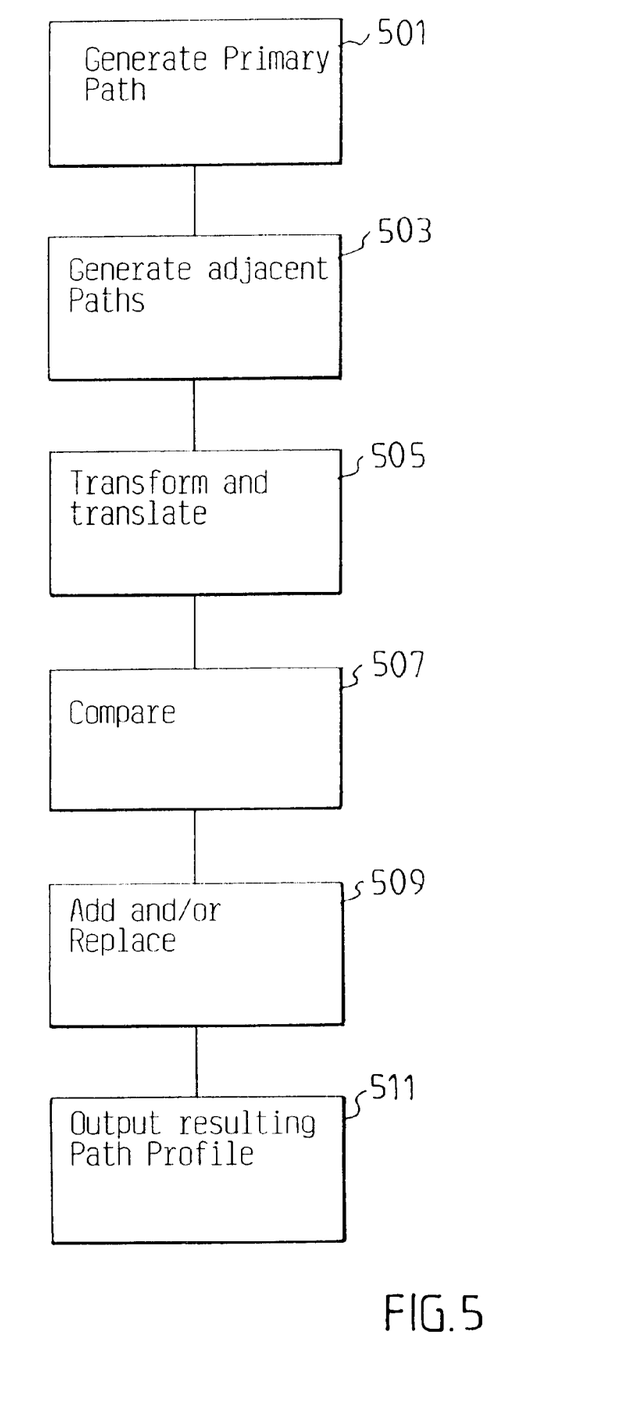
FIG. 5 is a flow chart illustrating the steps carried out when generating a multiple path profile.

Furthermore, FIG. 5 is a flow chart illustrating the steps performed in a system using the method described herein. Thus, first, in a block 501, a primary path profile is generated. Next, in a block 503 a number of adjacent path profiles are generated. The number of adjacent path profiles can be determined according to several different methods as described below. The obstacles found in the adjacent path profiles are then transformed according to some suitable algorithm, such as some of the algorithms described below, and the largest obstacles are translated onto the primary path profile. The transformation and translation is performed in a block 505.

Thereupon, in a block 507, each of the transformed and translated obstacles found in the primary path profiles is compared to the corresponding obstacle, i.e. the one located equally far from the path profile endpoints, in the primary profile, and if any of the translated and transformed obstacle is larger than the corresponding obstacle in the primary path profile, the transformed and translated obstacle is set to replace the corresponding obstacle in the primary path profile. This replacement is performed in a block 509.

Finally, in a block 511, the resulting path profile, which is constituted by the largest obstacles in the primary path profile and the largest transformed and translated obstacles of the adjacent path profiles, is output, e.g., using output device 14, for use in the radio wave propagation planning.

In the scheme described above the following input parameters must be specified:

The number of adjacent path profiles on each side of the primary.

The spacing (in meters or equivalent) between successive path profiles.

The endpoint coordinates (in km or equivalent) of each adjacent path profile.

These parameters may be specified by the user, e.g., using input device 12, set automatically by the system, or some may be set depending upon one or more of the others, as described below.

There are several ways to determine the number of path profiles to generate, for example:

User specified number of path profiles. The user specifies the number (N) of adjacent path profiles on each side of the primary path profile. A total of 1+2N path profiles will then be generated.

Raster based number of path profiles. The number of adjacent path profiles is set automatically, taking into account the following parameters:
i) The current raster separation (in meters or equivalent).
ii) The current path profile bearing (with respect to the grid coordinate system).
iii) The first Fresnel zone radius at the midpoint of the current path profile.

The first two parameters are used to find the raster based spacing (R) between successive path profiles, which is then used together with the Fresnel zone radius (F) to find the least number of path profiles that will cover the whole of the first Fresnel zone. A total of approximately 1+2(1+int(F/R)) path profiles will be generated in such a case.

Combination of user specified and raster based methods. The number of adjacent path profiles is first set automatically, according to above. The user specified number of path profiles, is then used as a condition:
  i) If the user specifies a zero value, this value will override the automatically calculated. The user supplied value effectively disables the adjacent path profile generation.
  ii) If the user specifies a non-zero value, the smaller of this value and the automatically calculated will be used. The user supplied value effectively sets a ceiling for the total number of generated path profiles.
  iii) An option for the user to specify an unlimited (i.e. "Automatic") number of path profiles should also be available.

Furthermore, there are several ways to determine the spacing between successive path profiles, for example:

User specified spacing. The user specifies the spacing (in meters or equivalent) between successive path profiles. This alternative, however, has two serious drawbacks:
  i) If the specified spacing is much smaller than the raster separation, the discrete endpoints of successive path profiles may degenerate, resulting in identical path profiles being generated. This will increase the system workload, without any net gain of information.
  ii) If the specified spacing is much larger than the raster separation, intermediate raster points may not be taken into account when generating the adjacent path profiles. This will result in a severe loss of vital raster information, undermining the whole purpose of the multiple path profile generation.

Raster based spacing. The spacing is set automatically, taking into account the following parameters:
  i) The current raster separation (in meters or equivalent).
  ii) The current path profile bearing (with respect to the grid coordinate system).

The raster separation ($\rho$) is used together with the path profile bearing ($\beta$) to find the raster based spacing (R) according to the following formula:

$$R = \rho \cdot \max(\sin(\beta), \cos(\beta))$$

This alternative does not have the drawbacks of the previous one, and is also more user-friendly, since it reduces the amount of user input required.

Further, there are several ways to determine the endpoint coordinates of adjacent path profiles, according to the following paragraphs.

As a first alternative, the endpoint coordinates of any adjacent path profile are determined from the discrete endpoint coordinates of the primary, offset by an integer multiple of the current raster separation, oriented along either or both of the cardinal axes of the grid. This alternative requires the radio wave propagation planning system to have specific knowledge of the inner mechanisms of the topography subsystem concerning the handling of path profile endpoint coordinates.

As another alternative, the endpoint coordinates of any adjacent path profile is calculated from the continuous endpoint coordinates of the primary one, offset by an integer multiple (n) of the specified path profile spacing (R), at right angles to the primary one, according to the following formulae:

$$WE_{ADJACENT} = WE_{PRIMARY} \pm n \cdot R \cdot \cos(\beta)$$

$$SN_{ADJACENT} = SN_{PRIMARY} \pm n \cdot R \cdot \sin(\beta)$$

where WE and SN designate the West-East and South-North coordinates of the endpoint, and $\beta$ denotes the path profile bearing.

This alternative uses the path profile generation routine to round off the specified endpoint coordinates to the nearest raster points, and is therefore more desirable than the previous.

When evaluating the uncertainties of the path profile generation method, the following techniques can be used:

Average and standard deviation. The average and standard deviation of the relative intrusion for all path profiles is calculated. The results are then displayed, or used for decisions taken internally in the system.

Primary and worst adjacent. The relative intrusion for the primary and the worst (i.e. most severely obstructed) adjacent path profile is saved. These values are then displayed, or used for decisions taken internally in the system.

Merging of adjacent path profiles with the primary profile. This part aims at producing a single, merged path profile that can be used in a radio wave propagation planning system without adversely affecting any of its existing functionality. Thus, information on significant obstacles, missing in the primary path profile, but present in the adjacent, are transferred onto the primary path profile, while retaining obstacles already present in the primary. No whole-scale merging of the complete path profiles is therefore required.

For each of the adjacent path profiles, a line-of-sight calculation is performed. The result of the calculations, i.e. the location and height of the, for example, three, most dominant obstacles on the profile, is substituted back into the primary path profile, taking the greater of the primary and adjacent obstacles at each obstacle location. Since, by definition, the adjacent path profiles are offset from the primary one, the obstacles in the former one will have to be transformed into some sort of equivalent primary path profile obstacles before substituting them into the latter.

Thus, one method is to move obstacles unchanged into the primary path profile. This technique assumes that the adjacent obstacle does in reality obstruct also the primary path profile, and in exactly the same way as it obstructs the adjacent path profile, but that it was missed out in the path profile generation process due to insufficient raster resolution or simplifications in the algorithm used. The obstacle in the adjacent path profile is simply moved to the primary path profile, without changing the obstacle height in any way. This approach is best suited for catching missed obstacles located close to the primary path profile, and should normally be used with N=1, or when the first Fresnel zone radius roughly equals the raster resolution.

Another method is to Transform obstacles into equivalent knife-edges in the primary path profile. This technique assumes that the adjacent obstacle in reality only obstructs a portion of the first Fresnel zone of the primary path profile, and should rightly be considered as a knife-edge protruding into the Fresnel zone from one of the sides, and not, as normally is the case, from below.

The obstacle in the adjacent path profile is first transformed to an equivalent knife-edge, before it is moved to the primary path profile. The obstacle height will be set so that the equivalent knife-edge vertical intrusion into the first Fresnel zone equals the original side-ways intrusion of the actual obstacle.

This approach is best suited for catching adjacent obstacles located far from the primary path profile, and should normally be used for N>>1, or when the first Fresnel zone radius is much larger than the raster resolution.

All of the described methods can be used separately, or in combination with each other. It should be noted that all gains in quality will inevitably be balanced by corresponding reductions in performance.

I claim:

1. A method of generating a path profile for radio wave propagation, comprising the steps of:

generating a first, primary path profile;

generating at least a second, adjacent, path profile at a distance from the primary path profile;

transforming and/or translating the at least second path profile onto the primary path profile, thereby forming a resulting path profile from the first path profile at the at least second path profile; and outputting the resulting path profile as the generated path profile.

2. A method according to claim 1, characterised in that several, adjacent, path profiles are generated at distances corresponding to a raster resolution used.

3. A method according to claim 1, characterised in that the adjacent path profile generated at the longest distance from the primary path profile is generated at a distance essentially corresponding to the radius of the first Fresnel zone at the mid-point thereof.

4. A device for generating a path profile for radio wave propagation, comprising:

means for generating a primary path profile;

means for generating at least a second, adjacent, path profile at a distance from the primary path profile;

means for transforming and/or translating the at least second path profile onto the primary path profile, thereby forming a resulting path profile from the first path profile at the at least second path profile; and means for outputting the resulting path profile as the generated path profile.

5. A device according to claim 4, characterised by means for generating several, adjacent, path profiles at distances corresponding to a raster resolution used.

6. A device according to claim 4, characterised by means for generating the adjacent path profile, located at the longest distance from the primary path profile, at a distance essentially corresponding to the radius of the first Fresnel zone at the mid-point thereof.

7. A method according to claim 2, characterised in that the adjacent path profile generated at the longest distance from the primary path profile is generated at a distance essentially corresponding to the radius of the first Fresnel zone at the mid-point thereof.

8. A device according to claim 5, characterised by means for generating the adjacent path profile, located at the longest distance from the primary path profile, at a distance essentially corresponding to the radius of the first Fresnel zone at the mid-point thereof.

9. A computer program product comprising computer readable coded instructions stored in a memory, the computer readable coded instructions being executable on a processor to which information is input via a user input device; the computer program performing upon execution the steps of:

generating a first, primary path profile;

generating at least a second, adjacent, path profile at a distance from the primary path profile;

transforming and/or translating the at least second path profile onto the primary path profile, thereby forming a resulting path profile from the first path profile at the at least second path profile; and outputting the resulting path profile as the generated path profile.

10. The computer program product of claim 9, wherein upon execution the computer program performs the further step of generating several adjacent path profiles at distances corresponding to a used raster resolution.

11. The computer program product of claim 9, wherein the computer program generates a longest distanced adjacent path profile from the primary path profile at a distance essentially corresponding to a radius of the first Fresnel zone at the mid-point thereof.

* * * * *